Inventor:
Archibald N. Wright,
by Paul R. Webb, II
His Attorney.

United States Patent Office 3,522,076
Patented July 28, 1970

3,522,076
PHOTOPOLYMERIZED FILM, COATING AND PRODUCT, AND METHOD OF FORMING
Archibald N. Wright, Schenectady, N.Y., assignor to General Electric Company, a corporation of New York
Continuation-in-part of application Ser. No. 530,971, Mar. 1, 1966. This application Feb. 23, 1967, Ser. No. 618,132
Int. Cl. C08f 1/18, 3/20
U.S. Cl. 117—93.31        8 Claims

ABSTRACT OF THE DISCLOSURE

A thin, continuous film is formed on a substrate by ultraviolet surface photopolymerization of a material in the gaseous phase. The material is selected from hexachlorobutadiene, tetrafluoroethylene, trifluoromonochloroethylene, monofluorotrichloroethylene, hexafluorobutadiene, hexafluoropropylene, mixtures thereof, acrylonitrile, 2,4-hexadiene, and 1,5-hexadiene. Such films are useful as coating on metallic and non-metallic substrates, capacitor dielectrics, cryogenic device insulation, insulation for microelectric devices, primer or insulation on electrically conductive wire, and for corrosion protection.

---

This application is a continuation-in-part application of my copending patent application Ser. No. 530,971, filed Mar. 1, 1966, and assigned to the same assignee as the present application.

This invention relates to photopolymerized films, coatings, and products including such films or coatings, and to methods of forming such films, coatings, and products, and more particularly to continuous films, coatings, composites, and products formed by ultraviolet surface photopolymerization of a material in the gaseous phase, and to methods of forming such films, coatings and products.

Thin films, which can be configurationally deposited are desirable for a wide variety of applications. It is further desirable that such thin films and coatings be adhesive to a substrate, and continuous thereon. The present invention is directed to improved thin films, coatings, composites and products having such films or coatings thereon which exhibit the above desirable characteristics and to methods of forming such films, coatings, and products having such films or coatings. The thin films and coatings of the present invention are formed by ultraviolet surface photopolymerization of a material in the gaseous phase selected from the group consisting of hexachlorobutadiene, tetrafluoroethylene, trifluoromonochloroethylene, monofluorotrichloroethylene, hexafluorobutadiene, hexafluoropropylene, mixtures thereof, acrylonitrile, 2,4-hexadiene, and 1,5-hexadiene.

U.S. Pat. 3,228,865 describes a process for polymerizing tetrafluoroethylene to provide a white polytetrafluoroethylene powder. However, this patent does not teach or disclose the direct formation from the above monomer of an adherent, continuous film on a substrate.

In addition to being configurationally deposited, continuous and adhesive, the films and coatings formed in accordance with my invention exhibit good chemical resistance, have high dielectric strength, are imperforate, and exhibit good temperature stability. These films and coatings are useful for a wide variety of applications including covering layers for various metallic and non-metallic substrates, capacitor dielectrics, cryogenic device insulation, insulation for microelectric devices, as a primer or as insulation on electrically conductive wire, and for corrosion protection.

Films and coatings formed in accordance with my invention from hexachlorobutadiene and acrylonitrile are also useful on diamonds, on cubic boron nitride (known as borazon) which is disclosed and claimed in U.S. Pat. 2,947,617, and in abrasive wheels using such coated diamonds or borazon imbedded, e.g., in an organic matrix. Films and coatings formed in accordance with my invention from tetrafluoroethylene, trifluoromonochloroethylene, hexafluoropropylene, and hexafluorobutadiene are also flexible, exhibit low surface tension, are water repellent, and are non-sticking on the exposed surface. These latter films and coatings are also useful on portions of various appliances such as the cooking surface of frying pans, the exterior surface of electric shaver heads, the moving screw parts of electric toothbrushes, the interior surface of percolators, the interior surface of clock motors, and on platinum electrodes for fuel cells.

Hexachlorobutadiene is a completely chlorosubstituted butadiene which behaves as fully saturated. Relative to 1,3-butadiene, hexachlorobutadiene is chemically inert. This material is not subject to conventional forms of polymerization. However, many attempts have been made to polymerize this material, including at pressures up to 100 atmospheres, but no known success has accompanied previous attempts to affect controlled polymerization of this monomer. It has also been reported in the literature that the application of pressures of about 1870 atmospheres to hexachlorobutadiene gave only what was described as a "resinous product." Tetrafluoroethylene, hexafluorobutadiene, hexafluoropropylene and acrylonitrile have been polymerized by conventional means. However, none of these materials has been polymerized by ultraviolet surface photopolymerization from a gaseous phase to which the present invention is directed to yield truly continuous films.

It is an object of my invention to provide a method of forming a continuous film by ultraviolet surface photopolymerization of a gaseous material.

It is another object of my invention to provide a method of forming in a predetermined pattern such a continuous film.

It is another object of my invention to provide a method of forming a continuous film by ultraviolet surface photopolymerization of a gaseous material in which the substrate is cooled during photopolymerization to increase the rate of film formation.

It is another object of my invention to provide a method of forming a continuous film on a substrate by ultraviolet photopolymerization of a gaseous material thereby forming a product or composite article.

It is another object of my invention to provide a method of forming a continuous coating on a substrate by ultraviolet surface photopolymerization of a gaseous material and removing subsequently the substrate by chemical etching.

It is a further object of my invention to provide a new composition of matter by ultraviolet surface photopolymerization of gaseous tetrafluoroethylene.

It is a further object of my invention to provide a new composition of matter by ultraviolet surface photopolymerization of gaseous tetrafluoroethylene.

It is a further object of my invention to provide an improved product having a substrate with a continuous film adhering to at least one surface of the substrate, which film is produced by ultraviolet surface photopolymerization of gaseous hexachlorobutadiene.

It is a still further object of my invention to provide a product having a substrate with a continuous film adhering to at least one surface thereof, which film is produced by ultraviolet surface photopolymerization of a gaseous material.

In accordance with my invention, a continuous film can be formed by ultraviolet surface photopolymerization of a gaseous material selected from the group recited above.

These and various other objects, features and advantages of the invention will be better understood from the following description taken in connection with the accompanying drawing in which:

FIG. 4 is a sectional view of an electrically conductive wire with a thin film thereon formed in accordance with my invention.

Figure 1:
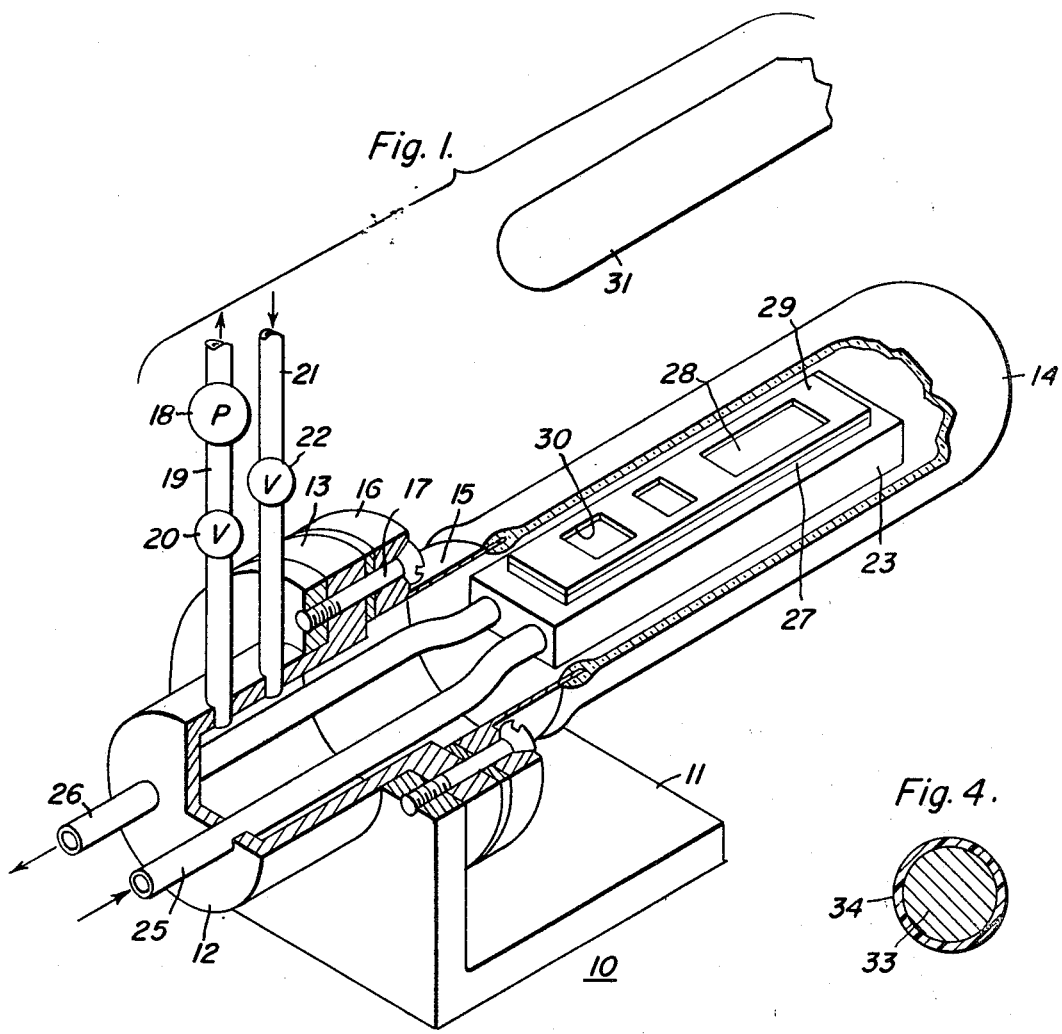
FIG. 1 is a perspective view partially in section of an apparatus for forming films, coatings and products in accordance with my invention.

In FIG. 1 of the drawing, apparatus is shown generally at 10 for forming films, coatings and products having such films or coatings thereon in accordance with my invention. A base or support surface (not shown) is provided on which is mounted an L-shaped bracket 11 to support an enclosure or chamber 12 having a flange 13 at its open end. A quartz tube 14 is bonded adjacent its open end by a suitable metal-ceramic seal to a metal cylinder 15 having a flange 16 at its opposite end. Flange 16 is readily threaded to and unthreaded from flange 13 of enclosure 12 by means of a plurality of threaded fasteners 17. A vacuum pump 18 is connected by a line 19 to enclosure 12 to evacuate enclosure 12 and associated quartz tube 14. A control valve 20 is provided in evacuation line 19. An inlet line 21 is connected at one end to enclosure 12 and at its other end to a source (not shown) of material to be supplied in gaseous state to tube 14. A control valve 22 is provided in line 21 to control the supply of material to enclosure 12 and tube 14.

A support block 23 of material such as copper is shown positioned within tube 14. Block 23 has an U-shaped metal tube 24 imbedded therein, two ends 25 and 26 of which extend through cylinder 15, flanges 16 and 13, enclosure 12 and through the wall of enclosure 12. Tube 24 circulates a cooling medium such as ethanol to block 23 and positions the block. The ends 25 and 26 of tube 24 are connected to a heat exchanger or to other cooling equipment. A substrate support 27 is shown positioned on support block 23. Substrate support 27 comprises, for example, a 1 inch x 3 inch glass microscope slide on the upper surface of which is a 0.25 micron aluminum film substrate 28. A stainless steel light mask 29, which is shown as the same size as the substrate support 27, is shown also with three slots 30 therethrough to provide formation of predetermined patterned thin films or coatings on the aluminum film substrate. An ultraviolet light 31, which is normally provided with a reflector (not shown), is shown outside and spaced above quartz tube 14 and supported in any suitable manner. For example, such a light source might be an Hanovia 700 watt lamp, which provides ultraviolet light having an effective wave length in the range of 2,000 angstroms to 3,500 angstroms, and which is directed by its reflector (not shown) toward the upper surface of aluminum film 28. A metal enclosure with a door, which is not shown, is positioned around the above apparatus during its operation.

Figure 2:
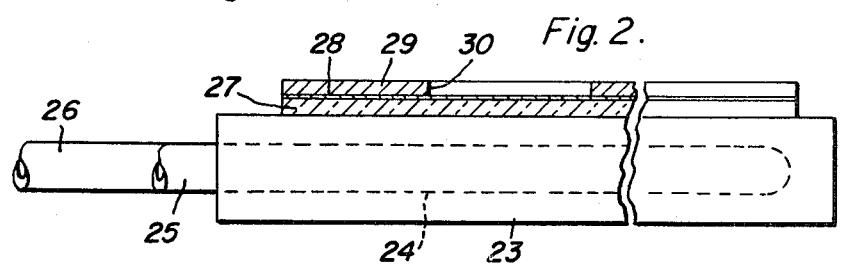
FIG. 2 is an enlarged side elevational view partially in section of a portion of the apparatus shown in FIG. 1.

In FIG. 2 of the drawing, an enlarged side elevational view is shown of support block 23 which was described above in connection with FIG. 1 of the drawing. Block 23 has an U-shaped tube 24 embedded therein, the two ends 25 and 26 of which circulate a cooling medium to and from block 23, respectively. Substrate support 27 and light mask 29 are shown partially in section to disclose more clearly the aluminum film substrate 28 thereon. While three slots 30 are described for light mask 29, a single slot or a plurality of slots either connected or disconnected may be employed. Masks are also usable which have different configurational patterns.

Figure 3:
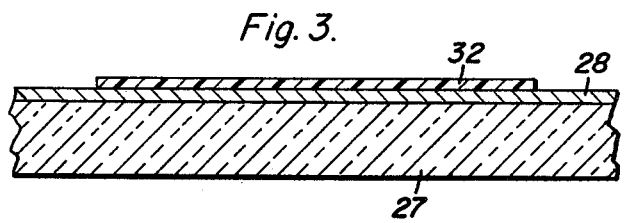
FIG. 3 is a sectional view of a substrate with a thin film thereon formed in accordance with my invention.

In FIG. 3 of the drawing, there is shown a glass substrate support 27 with a 0.25 micron thick aluminum film substrate 28 thereon. A continuous film 32 is shown adhering firmly to the upper surface of the aluminum film 28 in accordance with the method of my invention using the apparatus shown in FIG. 1.

In FIG. 4 of the drawing, there is shown a sectional view of a copper core 33 which has a continuous thin film 34 adhering firmly thereto, produced by ultraviolet surface photopolymerization of gaseous hexachlorobutadiene.

I have discovered unexpectedly that a continuous film could be formed by a method which comprises photopolymerizing a material in the gaseous phase selected from the group consisting of hexachlorobutadiene, tetrafluoroethylene, trifluoromonochloroethylene, monofluorotrichloroethylene, hexafluoropropylene, hexafluorobutadiene mixtures thereof, acrylonitrile, 2,4-hexadiene, and 1,5-hexadiene on the surface of a substrate member with ultraviolet light at a relatively low vapor pressure for the gaseous material. When tetrafluoroethylene is employed as the monomer, the preferred effective wave length of the ultraviolet light is in the range from 1800 angstroms to 2400 angstroms. When other monomers from the above group are used, it is preferred to use ultraviolet light with an effective wave length in the range of 2000 angstroms to 3500 angstroms. When hexachlorobutadiene is used, the most effective wave length is in the range of 2200 angstroms to 3000 angstroms. A relatively low vapor pressure for the gaseous material is used in the formation of the continuous films. When tetrafluoroethylene is used as the monomer, it is preferred that the vapor pressure for this gaseous material does not exceed 3.0 millimeters of mercury. With other monomers from the above group, the vapor pressure for the gaseous material is employed in a preferred range of from 0.1 to 8.0 millimeters of mercury.

I have also found that these continuous films are imperforate. I have discovered that further advantages can be derived by cooling the substrate during the formation of the film thereon thereby increasing the rate of film formation. I have found further that subsequent to the formation of the above type of continuous film formed on the substrate, the substrate could be removed, for instance, by chemical etching with hydrochloric acid or hydrofluoric acid, thereby providing an unsupported body of the film.

I have discovered unexpectedly that by subjecting tetrafluoroethylene to photopolymerization in accordance with my process I am able to obtain a new composition of matter comprising a continuous polymer which consists essentially of carbon atoms and fluorine atoms. Under particular conditions, a ratio of approximately 2 fluorine atoms to each carbon atom was shown by an elemental analysis of such a polymer. However, infrared analyses show the presence to a significant extent of functional groups not associated with polytetrafluoroethylene, which are probably $CF_3$ groups. Differential scanning calorimetry data shows no evidence of first order crystal-crystal transition at about 20° to 30° C. as found in conventional polytetrafluoroethylene. The new composition of matter has an index of refraction of about 1.5. When tetrafluoroethylene is employed in my process, the temperature of the deposition substrate should preferably be in a range from 0° C. to 60° C. and the vapor pressure of the gaseous monomer should be not greater than 3.0 millimeters of mercury or a continuous film of my new composition of matter will not form.

I have discovered unexpectedly that by subjecting hexachlorobutadiene to photopolymerization in accordance with my process I am able to obtain a new composition of matter comprising a continuous polymer which consists essentially of carbon atoms and chlorine atoms. The empirical formula of the polymer does not necessarily correspond to the empirical formula of the monomer. Under particular conditions, a ratio of approximately two carbon atoms to each chlorine atoms was shown by an elemental analysis of such a polymer. Similarly, other gaseous materials from the above group, with the exception of tetrafluoroethylene, when they are polymerized by a surface ultraviolet photopolymerization result in a film, coating or a product having a film or coating thereon from the gaseous material in which the empirical formula does not necessarily correspond to the emipircal formula of the monomer although a different polymeric film is formed for each monomer.

In an illustrative operation of the apparatus shown in FIG. 1 of the drawing, a substrate support 27 in the form of a 1 inch x 3 inch glass microscope slide with a 0.25 micron thick aluminum film substrate 28 thereon was positioned on copper support block 23. A stainless light mask 29 of dimensions 1 inch x 3 inches with three slots therein was placed on the upper surface of the aluminum film substrate 28 thereby covering film substrate 28 except for slots 30. Quartz tube 14 was then attached by its flange 16 to flange 13 to enclosure 12 by means of threaded fasteners 17. Vacuum pump 18 was started and pumped down the chamber defined by tube 14, cylinder 15, enclosure 12 to a pressure of about 2 microns of mercury. Valve 20 was then closed. A material selected from the group consisting of hexachlorobutadiene, tetrafluoroethylene, trifluoromonochloroethylene, monofluorotrichloroethylene, hexafluoropropylene, hexafluorobutadiene, mixtures thereof, acrylonitrile, 2,4-hexadiene, and 1,5-hexadiene was supplied from a liquid source (not shown) through the line 21 in a gaseous state to enclosure 12 whereby it was fed into the interior of quartz tube 14. Each of the above materials is initially retained in its liquid state by maintaining its temperature below room temperature which is accomplished by employing a cooling bath surrounding the liquid materials. The liquid, other than tetrafluoroethylene, is also maintained at a preferred vapor pressure in the range of 0.1 to 8.0 millimeters of mercury by the temperature of the cooling bath whereby its introduction from the source to the inlet line is in a gaseous state. Tetrafluoroethylene is maintained at a preferred vapor pressure which does not exceed 3.0 millimeters of mercury. Ultraviolet lamp 31 was positioned above quartz tube 14 and spaced approximately two inches from the upper surface of aluminum film 28.

The monomer was introduced into quartz tube 14 and the pressure rose. A metal hood (not shown) is positioned around apparatus 10 since an ultraviolet light source is used. Lamp 31 is turned on. After a period of time, lamp 32 was shut off, monomer valve 22 was closed, and the system was pumped down to about 2 microns pressure to remove all byproducts. The metal hood was removed and the vacuum was then broken. Tube 14 was cooled to room temperature and disconnected by unthreading fasteners 17 which held its associated flange 16 to flange 13. After tube 14 was removed, metal light mask 29 was removed and substrate support 27 was picked up and examined. A continuous film had been formed on aluminum film substrate 28 which was imperforate.

Such a film as described above is shown in FIG. 3 of the drawing. Glass substrate support 27 is shown with aluminum film 28 thereon. A continuous film 32 is shown adhering to the upper surface of film 28 on which film 32 is formed by ultraviolet surface photopolymerization of the gaseous material in the apparatus of FIG. 1.

Such a film as described above is shown in FIG. 3 of the drawing. Glass substrate support 27 is shown with aluminum film 28 thereon. A continuous film 32 is shown adhering to the upper surface of film 28 on which film 32 is formed by ultraviolet surface photopolymerization of the gaseous material in the apparatus of FIG. 1.

While it is stated above in the operation of the apparatus of FIG. 1, that an aluminum film substrate was employed for the formation thereon of a continuous film formed from the gaseous material, many other metallic and non-metallic substrates in various forms and configurations, such as fibers, whiskers, and particles, can be employed in the process. For example, such a film is formed of metallic substrates including lead, niobium, copper, gold, steel, iron, brass, and aluminum. Various non-metallic materials are employed such as glass, quartz, mica, carbon, diamonds and borazon.

Examples of films, coatings and products including such films and coatings embodying my invention and methods of making such films and coatings and products including such films and coatings in accordance with my invention are set forth below:

EXAMPLE 1

Apparatus was set up in accordance with FIG. 1 of the drawing. A substrate support, a microscope glass slide 1 inch x 3 inches, which was provided with a 0.25 micron thick aluminum film substrate thereon, was positioned on the copper support block. A stainless steel light mask 1 inch x 3 inches and having three slots therein was placed on the surface of the aluminum substrate. The quartz tube was positioned around the support block by threading its flange to the flange of the enclosure to which the gaseous material supply line and vacuum pump were connected. An ultraviolet light source, in the form of an Hanovia 700 watt lamp with a reflector was positioned above the quartz tube and spaced about two inches from the upper surface of the aluminum film substrate. The system was pumped down to a pressure of 2 microns and the control valve was closed. Hexachlorobutadiene of 99.7% purity was introduced in the gaseous state into the quartz tube. This monomer was maintained at its source (not shown) in liquid form by positioning in a cooling bath which was held at a temperature of 18° C. thereby providing a vapor pressure of 0.14 millimeter of mercury. Upon opening of the control valve in the supply line, the gaseous hexachlorobutadiene was supplied to the quartz tube. A metal hood was positioned around the apparatus. The lamp, which had an effective wave length in the range from 2,000 angstroms to 3,500 angstroms, was turned on. Hexachlorobutadiene in gaseous state was supplied to the quartz tube under the above light for a period of 285 minutes. In this operation, a film was formed on the aluminum film substrate by ultraviolet surface photopolymerization of gaseous hexachlorobutadiene.

While it is not shown in the drawing, a plurality of thermocouples was provided to measure the temperature of the substrate and of the surface of the evaporated aluminum film to provide temperature information. While cooling means for the substrate are shown in FIG. 1 of the drawing and described above, cooling means were not employed in this example. An average temperature of 177° was obtained from substrate and aluminum film measurements. The process was concluded by discontinuing the supply of gaseous hexachlorobutadiene, turning off the ultraviolet light source, removing the hood opening the vacuum pump control valve, and pumping down the interior of enclosure 12 and tube 14 to a pressure of about 10 microns to remove gaseous material and any by-products therefrom. The vacuum was then broken and the quartz tube was removed by unthreading its flange from the enclosure flange. The light mask was removed and the aluminum film on the glass substrate was examined. Visual examination disclosed three separate thin films, each of which was continuous. The film was measured by capacitance and interferometric techniques and found to have an average thickness of 480 angstroms. Thus, the growth rate was 1.67 angstroms per minute. The film was further tested and its breakdown strength was determined to be 5.6 volts D-C at 495 angstroms and 5.3 volts D-C at 450 angstroms.

Thus, a product was obtained from this example which comprised a glass base with an aluminum film substrate thereon on which a continuous, imperforate, thin film adhered to the upper surface of the substrate.

An elemental analysis of the film was obtained by subsequently coating both sides of a 6 inch x 0.5 x 0.5 mil aluminum foil with a thicker, approximately 20,000 angstroms film from the same 99.7% hexachlorobutadiene under the above conditions. This film showed 43% carbon, 50% chlorine, and 3% hydrogen, by weight. A chlorine/carbon atomic ratio of about 0.4 to 1 indicated considerable chlorine loss from the monomeric material. Mass spectral analysis confirmed that chlorine was the major constituent of the liquid nitrogen-condensable, gas phase products of the surface photopolymerization process.

EXAMPLES 2–6

In the following examples, the same apparatus, substrate, material and procedures were followed as in Example 1. Table I sets forth below the example number, the purity of hexachlorobutadiene which was employed, the time of film formation in minutes, the average substrate temperature in degrees centigrade, the average film thickness in angstroms, the growth rate of the film in angstroms per minute, the breakdown strength of the film in volts direct current, and the dielectric strength in volts $\times 10^6$ per centimeter.

TABLE I

| Example Number | Monomer Purity, percent | Time, Min. | Average Substrate Temp., °C. | Average Film Thickness, A. | Growth Rate, A./Minute | Breakdown Strength, Volts DC |
|---|---|---|---|---|---|---|
| 2 | 99.7 | 285 | 177 | 508 | 1.78 | 9.0 at 525 A. |
| 3 | 100 | 275 | 177 | 645 | 2.35 | 8.5 at 455 A. |
| 4 | 100 | 60 | 115 | 1,990 | 33.2 | |
| 5 | 100 | 30 | 115 | 1,110 | 36.7 | |
| 6 | 99.7 | 15 | 102 | 2,040 | 136.0 | 24 at 2,050 A. |

Each of the films in these Examples 2–6 was continuous. It will be noted that cooling of the substrate was employed in Example 6 whereby the average substrate temperature was maintained at 102° C. during film formation. With this cooling of the substrate, a much higher growth rate for the film was accomplished.

EXAMPLE 7

The same apparatus, method and substrate as described above in Example 1 were employed in this example, but the gaseous material employed was tetrafluoroethylene rather than hexachlorobutadiene and a vapor pressure of 3 millimeters of mercury was employed. The process was continued for a period of 12 minutes resulting in an average thickness of the film of 800 angstroms. Cooling was again employed for the substrate which was maintained at a temperature of about 30° C. Thus, the growth rate was approximately 67 angstroms per minute. A continuous, imperforate film was formed on the substrate.

EXAMPLE 8

The same apparatus and method as described above in Example 1 were employed in this example. A 1 inch x 7 inch aluminum frying pan strip was used as the substrate on which the gaseous tetrafluoroethylene was surface photoploymerized. The process was continued for a period of approximately 15 minutes to provide a resulting film thickness of 1,000 angstroms. Thus, the growth rate was approximately 67 angstroms per minute. As in Example 7, cooling was employed for the substrate resulting in an average substrate temperature of 30° C. The aluminum substrate had a continuous film formed thereon.

EXAMPLE 9

The same apparatus, method and substrate as described above in Example 7 were employed in this example. The substrate was maintained at a temperature of about 0° C. After 12 minutes, the film had an average thickness of 800 angstroms. The growth rate was approximately 67 angstroms per minute. A continuous, imperforate film was formed on the substrate.

EXAMPLE 10

The same apparatus and method as described above for Example 1 were employed in this example. Three substrates were used. The starting material was tetrafluoroethylene. One was a nickel shaver screen, another was a shaver cutter, and the third was a flat nickel material 1.5 inches x 1 inch x 3 mils. The process was continued for a period of 12 minutes resulting in an average thickness of the film of 800 angstroms. Thus, the growth rate was approximately 67 angstroms per minute. Cooling was again employed for the substrates to maintain an average substrate temperature of about 30° C. The metal portions of the shaver screen, cutter and nickel substrate had a continuous film formed thereon.

EXAMPLE 11

The apparatus and method of Example 1 were employed in this example. Trifluoromonochloroethylene is the starting material and a vapor pressure of 3 millimeters of mercury is employed. The process continued for a period of 45 minutes resulting in an average thickness of the film of 10,250 angstroms on an aluminum substrate. Thus, the growth rate was 228 angstroms per minute. During the process, cooling of the substrate was employed to provide an average substrate temperature of 115° C. A continuous film is formed on the substrate.

EXAMPLE 12

The apparatus and method of Example 1 are also employed in this example. The starting material is monofluorotrichloroethylene and a vapor pressure of 3 millimeters of mercury is employed. The process is continued for a period of 30 minutes to provide an average thickness of the film of 1,500 angstroms on an aluminum substrate. Thus, a growth rate of 50 angstroms per minute is accomplished. Cooling is also employed resulting in an average substrate temperature of 115° C. A continuous film is formed on the substrate.

EXAMPLE 13

The apparatus and method of the Example 1 are employed. However, in this example hexafluorobutadiene is used as the starting material. A vapor pressure of 3 millimeters of mercury is employed. The process is continued for a period of 10 minutes resulting in a film having an average thickness of 1,500 angstroms on an evaporated aluminum substrate. Thus, the growth rate is 150 angstroms per minute. The substrate is cooled to a temperature of 100° C. during the process. A continuous film is formed on the substrate.

EXAMPLE 14

The apparatus and method of Example 1 was employed. However, in this example hexafluoropropylene was used as the starting material. A vapor pressure of 2 to 3 millimeters of mercury was employed. The process was continued for a period of 30 minutes resulting in the film having an average thickness of 270 angstroms on an aluminum foil substrate. Thus, the growth rate was 9 angstroms per minute. The substrate was cooled to a temperature between 6 to 15° C. A continuous film was formed on the substrate, which had a dissipation factor of about one percent.

EXAMPLE 15

The apparatus and method of Example 1 were employed in this example. The starting material was acrylonitrile. A vapor pressure of 4 millimeters of mercury was employed. Twelve evaporated aluminum strips were each coated with a film having an average thickness of 13,000 angstroms in a period of 75 minutes. Thus, the rate of growth was 173 angstroms per minute. The substrate was cooled by circulating ethanol through an ice bath. Subsequently, each strip with its continuous imperforate film was coated with a layer of evaporated aluminum and leads were attached to produce capacitors of dielectric area 0.25 cm.$^2$. These capacitors, when tested, exhibited capacitance in the range from 980 to 1,660 picofarads and a dissipation factor in the range of 0.025 to 0.09.

EXAMPLE 16

The apparatus, method, material and conditions of Example 1 were employed in this example. The starting material was acrylontirile. Twelve additional evaporated aluminum strips were each coated with a film having an average thickness of 6,500 angstroms in a period of 65 minutes. The substrate was cooled by circulating ethanol through an ice bath. Subsequently, each strip with its continuous imperforate film was coated with a layer of evaporated aluminum and leads were attached to provide capacitors of dielectric area 0.25 cm.$^2$. These capacitors, when tested, exhibited capacitance in a range from 2,250 to 2,650 picofarads and a dissipation factor in the range of 0.026 to 0.3.

EXAMPLE 17

The same apparatus, methods, and conditions as were employed in Example 1 were employed in this example. A film having an average thickness of 2,040 angstroms was produced from gaseous hexachlorobutadiene. The glass slide with the aluminum film thereon and the continuous film thereon, was treated with hydrofluoric acid to remove both the glass and aluminum film thereby providing a body of material which consisted essentially of carbon atoms and chlorine atoms.

EXAMPLE 18

In this example the same apparatus, method and material were employed as in Example 1. In this example, 100% pure hexachlorobutadiene is employed. Cooling is also used whereby the average temperature of the substrate is maintained at a temperature of 102° C. during the process. The substrate is a copper electrical wire. The process is continued for a period of 15 minutes, at the end of which a film of an average thickness of 2,040 angstroms is produced on approximately one-half of the wire surface. Thus, the growth rate is 136 angstroms per minute. The experiment is suspended temporarily while the wire is turned over to expose the remaining portion. The process is again repeated to form a film on the uncoated portion. The resulting product is a copper wire with a continuous coating thereon.

EXAMPLE 19

In this example the same apparatus, method and material were employed as in Example 1. In this example, tetrafluoroethylene is employed. Cooling is also used whereby the average temperature of the substrate is maintained at a temperature of 30° C. during the process. The substrate is a stainless steel razor blade. The process is continued for a period of 15 minutes, at the end of which a film of an average thickness of 1,000 angstroms is produced on one surface of the razor blade. Thus, the growth rate is 67 angstroms per minute. The experiment is suspended temporarily while the razor blade is turned over to expose the opposite surface. The process is again repeated to form a film on the opposite surface. The resulting product is a razor blade with a continuous coating thereon.

As it will be appreciated by those skilled in the art, mixtures of the above gaseous materials can be ultraviolet surface photopolymerized to form a continuous film. An illustrative example of employing such a mixture is set forth below in Example 20.

EXAMPLE 20

In this example, the same apparatus, methods and conditions were employed as in Example 1. A continuous film having an average thickness of 2,520 angstroms was produced from a gaseous mixture of hexachlorobutadiene and of tetrafluoroethylene. Cooling was used whereby the average temperature of the aluminum film substrate was maintained at a temperature of about 53° C. The process was continued for a period of 41 minutes.

EXAMPLE 21

The apparatus and method of Example 1 were employed in this example. The starting material was 1,5-hexadiene and a vapor pressure of 4.0 millimeters of mercury was employed. The process continued for periods of 14 and 28 minutes respectively, to provide an average thickness of the films of 475 and 945 angstroms on aluminum substrates. Thus, growth rates of about 34 angstroms per minute were accomplished. Cooling was also employed resulting in average substrate temperatures of 67° C. and 84° C. A continuous film was formed on each of the substrates.

EXAMPLE 22

The apparatus and method of the Example 1 were employed. However, in this example 2,4-hexadiene was used as the starting material. A vapor pressure of 4.0 millimeters of mercury was employed. The process was continued for periods of 5 and 10 minutes, respectively, resulting films having an average thickness of 700 and 6,100 angstroms on evaporated aluminum substrates. Thus, the growth rates were 140 and 610 angstroms per minute. The substrates were cooled to temperatures of 84° C. and 112° C. during the process. A continuous film was formed on each of the substrates.

In a copending patent application Ser. No. 530,938, filed Mar. 1, 1966 (now U.S. Pat. 3,408,172 Wright), there is disclosed and claimed an adhesive abrasive particle and an abrasive particle. Films, which are formed on these abrasive particles, are produced by the method described and claimed in the present application. In another copending patent application Ser. No. 530,813, filed Mar. 1, 1966, there is disclosed and claimed a capacitor with a dielectric layer which is formed by the method disclosed and claimed in the present application. Both of these copending applications are assigned to the same assignee as the present application.

While other modifications of the invention and variations of method which may be employed within the scope of the invention have not been described, the invention is intended to include such as may be embraced in the following claims.

What I claim as new and desire to secure by Letters Patent of the United States is:

1. A method of forming a continuous, imperforate, and adhesive film which comprises ultraviolet surface photopolymerization on a substrate of a material in the gaseous phase consisting essentially of a member selected from the group consisting of hexachlorobutadiene, tetrafluoroethylene, trifluoromonochloroethylene, monofluorotrichloroethylene, hexafluorobutadiene, hexafluoropropylene, and mixtures thereof.

2. The method as in claim 1, in which the substrate is cooled during photopolymerization thereby increasing the rate of film formation.

3. The method as in claim 1, in which the film is formed in a predetermined pattern.

4. The method as in claim 1, in which the material is tetrafluoroethylene, the substrate is cooled to a temperature in the range of 0° C. to 60° C. during photopolymerization, the vapor pressure of the gaseous material does not exceed 3.0 millimeters of mercury, and the effective wave length of the ultraviolet light is in the range from 1,800 to 2,400 angstroms.

5. The method as in claim 1, in which the material is hexachlorobutadiene, the vapor pressure of the gaseous material is in the range from 0.1 to 8.0 millimeters of mercury, and the effective wave length of the ultraviolet light is in the range from 2,200 to 3,000 angstroms.

6. A composition of matter comprising a polymer consisting essentially of carbon atoms and fluorine atoms formed by ultraviolet surface photopolymerization of a gaseous material consisting essentially of tetrafluoroethylene, said polymer characterized by functional groups unassociated with tetrafluoroethylene, an index of refraction of about 1.5, and first order crystal-crystal stability at about 20° to 30° C.

7. A product comprising a substrate, a continuous film adhering firmly to at least one surface of said substrate, said film comprising a polymer consisting essentially of carbon atoms and chlorine atoms formed by ultraviolet surface photopolymerization of gaseous hexachlorobutadiene.

8. A product comprising a substrate, a continuous film adhering firmly to at least one surface of said substrate, said film comprising a polymer consisting essentially of carbon atoms and fluorine atoms formed by ultraviolet surface photopolymerization of a gaseous material consisting essentially of tetrafluoroethylene, said polymer characterized by functional groups unassociated with tetrafluoroethylene, an index of refraction of about 1.5, and first order crystal-crystal stability at about 20° C. to 30° C.

References Cited

UNITED STATES PATENTS

| 2,722,512 | 11/1955 | Crandall | 204—159.23 |
| 3,068,510 | 12/1962 | Coleman. | |
| 3,228,865 | 1/1966 | Vogh | 204—159.23 |
| 3,235,611 | 2/1966 | Jeffrey | 204—159.22 X |
| 3,240,690 | 3/1966 | Murch | 204—159.22 |
| 3,271,180 | 9/1966 | White | 117—212 X |
| 3,392,051 | 7/1968 | Caswell et al. | 117—93.31 X |

OTHER REFERENCES

Da Silva et al.: "Formation of Polymer Films by Low Energy Electron Radiation," from IBM Technical Disclosure Bulletin, vol. 7, No. 9, February 1965, p. 737.

Lintz: "Irradiation of Methacrylonitrile,1,3-Butadiene and Hexachlorobutadiene," U.S. At. Energy Comm., TID 22236 (1965) [Abstract in Chem. Abst., vol. 64, 2901e (1966)].

Atkinson: J. Chem. Soc. (London), pp. 2684–94 (1952).

Vlasov et al.: "Dokl. Akad. Nauk SSR," vol. 144, pp. 382–3, 1962 (from Chem. Abstracts, September 1962, vol. 57, 7479i).

ALFRED L. LEAVITT, Primary Examiner

J. H. NEWSOME, Assistant Examiner

U.S. Cl. X.R.

204—159.22; 260—92.3; 117—161; 264—22, 81